United States Patent Office 3,281,576
Patented Oct. 25, 1966

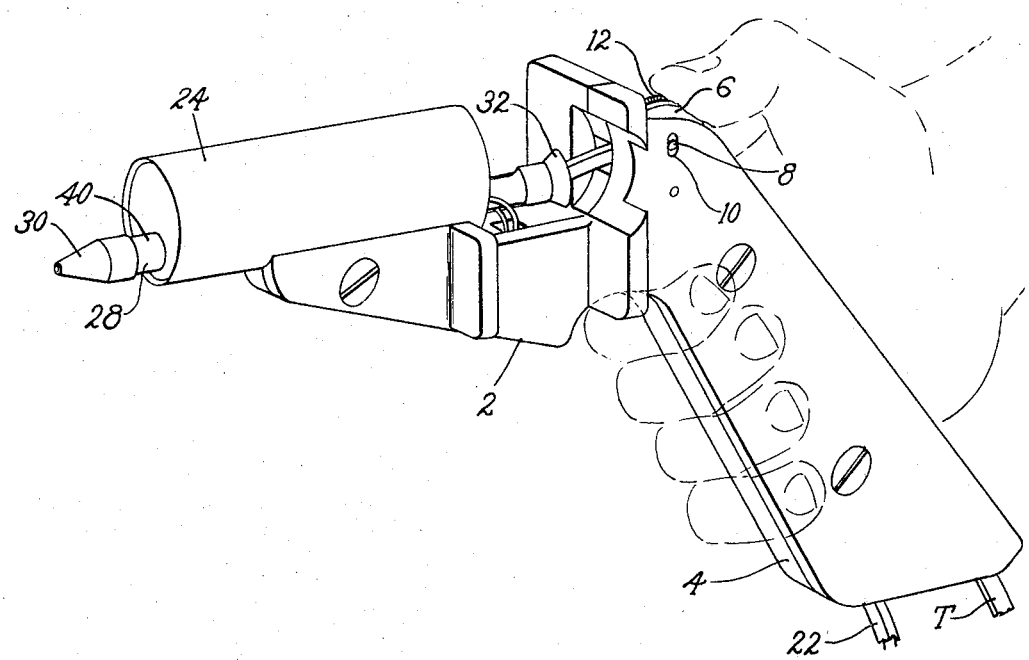

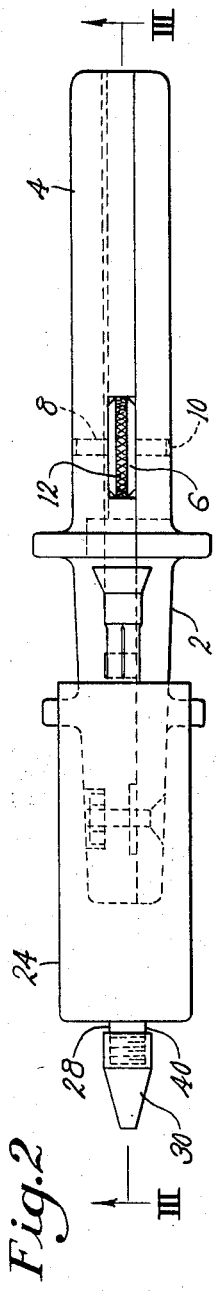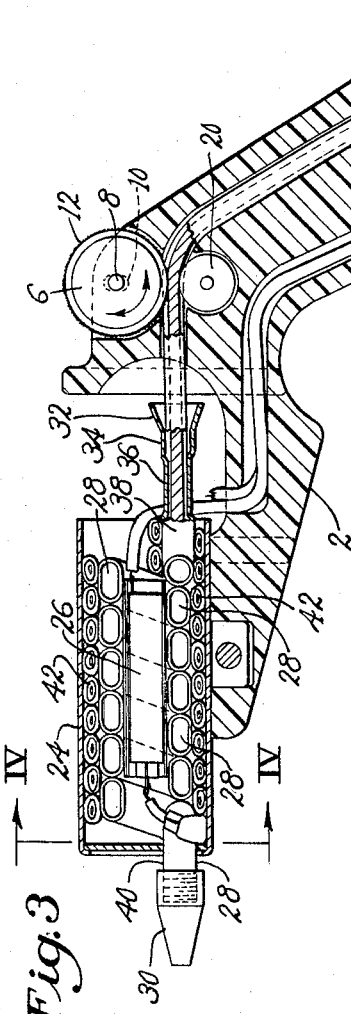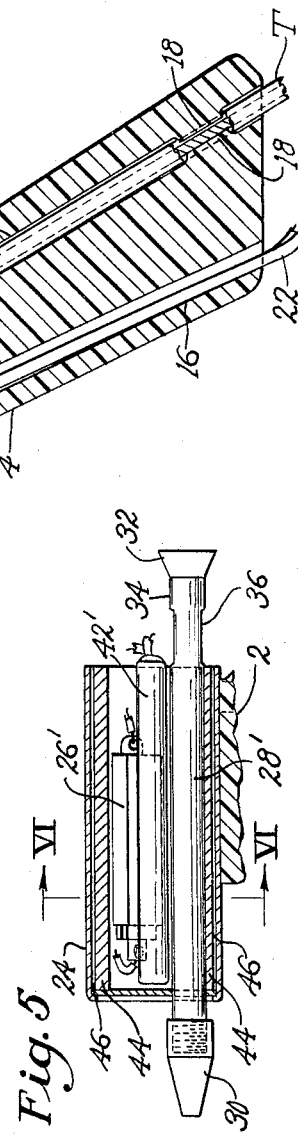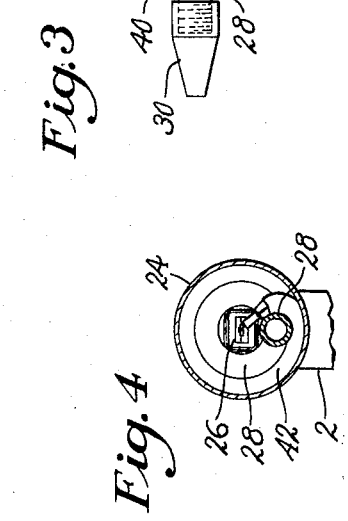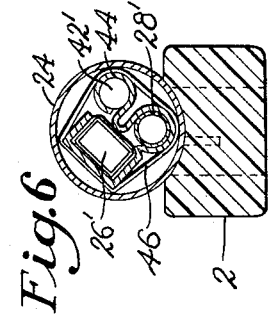

3,281,576
ELECTRICALLY HEATED THERMOPLASTIC CEMENT EXTRUDER
George H. Cooper, Byfield, and Albert E. Newton, Beverly, Mass., assignors to United Shoe Machinery Corporation, Flemington, N.J., a corporation of New Jersey
Filed Apr. 6, 1964, Ser. No. 357,439
2 Claims. (Cl. 219—421)

This invention relates to cement extruders and more particularly to an improved no-drip hand held thermoplastic extrusion device.

There are many instances in which it is desirable to apply a small quantity of quick setting cement to a piece of work as, for example, in closing a carton, in the manufacture of shoes, or in repairing furniture. Thermoplastic cements are very satisfactory for such work because of their quick setting properties and the strong bond which they afford. Tools for the application of thermoplastic cements often have a heatable barrel portion of cylindrical configuration aligned with a passage in the frame of the tool. Usually the tools are so arranged that the temperature of a thermoplastic material disposed in the passage in the frame of the tool is maintained below the melting point of the thermoplastic, while the temperature of the barrel portion is raised to a point sufficient to insure melting of the thermoplastic disposed in that portion. A feed means is provided for urging the thermoplastic material from the passage in the frame to the heatable barrel portion, causing the melted material to be extruded from the barrel.

A problem in the devices of this type has been the "drool" or drippage of the melted thremoplastic from the barrel when the extruder is not being used, as when the device is laid aside between periods of use. If the heater element is not turned off immediately upon completion of a cementing operation, the thermoplastic in the barrel continues to melt and, even though the thermoplastic rod is no longer fed into the barrel, often drools out of the nozzle end. Usually, in hand units, the only off-on devices are a thermostat which allows the heater element to furnish heat at a level suitable for melting of the thermoplastic, and the male "plug-in" member for connecting the device to a source of electricity. The thermostat usually functions to allow the heater element to melt the thermoplastic and maintain it in a fluid state, susceptible to drool. Disconnecting the plug between frequent and intermittent uses is inconvenient and often impractical as a means of preventing cement drool. Consequently, there is frequently a steady drool from the nozzle portion when the tool is set aside. A simple off-on switch would be convenient but would, in the off position, allow the molten cement to completely harden, necessitating a "warm-up" period, or a waiting time sufficient to permit re-melting of the hardened cement.

In addition to drooling from the nozzle, the melted thermoplastic frequently finds its way back toward the entrance end of the barrel. Frequently the entrance end of the barrel is separated slightly from the frame passage so that the heat imparted to the barrel section, where cement melting is desired, will not be conducted to the frame passage, where it is desirable to maintain the cement in solid rod form. Where an air gap separates the frame passage from the heatable barrel the melted cement frequently oozes out of the barrel entrance and in part drops from the device and in part solidifies due to air cooling and hardens around the entrance to the barrel. The hardened ring, or "crust," around the thermoplastic rod frequently obstructs the free movement of the rod into the barrel. This is particularly true in hand gun models in which the force of the operator's hand feeding must overcome the resistance of the crust.

An object of the invention is to provide a low cost no-drip hand held cement applying tool in which thermoplastic cement in convenient rod form can be easily and effectively used. A feature of the invention resides in an improved arrangement of the heater, thermostat and barrel members which effects a substantially instantaneous cessation in output of the heater element upon completion of each cementing operation. An additional feature of the invention resides in a barrel entrance adapted to store drippage and, upon a subsequent use of the tool, heat the drippage so as to re-melt it, and affording means for re-entry of the melted drippage into the barrel.

The above and other features of the invention, including various novel details of construction and combinations of parts will now be more particularly described with reference to the accompanying drawings and pointed out in the claims. It will be understood that the particular machine embodying the invention is shown by way of illustration only and not as a limitation of the invention. The principles and features of this invention may be employed in varied and numerous embodiments without departing from the scope of the invention.

In the drawings:
FIG. 1 is a perspective view showing one form of tool embodying the invention;
FIG. 2 is a plan view;
FIG. 3 is a section taken substantially along line III—III of FIG. 2;
FIG. 4 is a section taken along line IV—IV of FIG. 3;
FIG. 5 is a section similar to a portion of FIG. 3, but showing an alternate form of tool embodying the invention, and
FIG. 6 is a section taken along line VI—VI of FIG. 5.

As illustrated in FIGS. 1-3, the device comprises a frame 2 including a grip portion 4. The grip 4 is adapted to retain a feed wheel 6 having hubs 8 which ride freely, rotatably and slidably, in a pair of slots 10 in the frame 2. The feed wheel 6 has formed about its periphery, as by knurling, a continuous set of teeth 12.

The frame is provided with channels 14 and 16 (FIG. 3) extending the length of the frame. The channel 14 contains a pair of guide vanes 18 for purposes described below. Disposed between the channels 14 and 16 and directly below the feed wheel 6 is a low friction roller 20.

The channel 14 is adapted to receive a thermoplastic material T in solid rod form, of the type disclosed in United States Letters Patent No. 2,874,084, granted February 17, 1959. Such rod form has indentations of substantially V configuration on opposite sides of the rod. The teeth 12 of the feed wheel 6 are shaped to engage one of the V portions of the thermoplastic rod T. The periphery of the roller 20 is shaped to engage the other V portion of the thermoplastic material. The guide vanes 18 are disposed within the channel 14 for engaging the V portions of the rod T, thereby causing the rod to approach the feed wheel 6 and the low friction roller 20 in the proper attitude. The channel 16 retains electrical leads 22 which are adapted for "plugging in" to an ordinary 110 volt A.C. household outlet.

Attached to the forward portion of the frame 2 is a cylindrical housing 24 containing a thermostat 26. Wound about the thermostat 26 is a barrel member 28, made of copper or the like, which at its forward end is adapted to receive interchangeable nozzles 30. The nozzles may be provided with bayonet type fittings or threaded fittings to facilitate easy removal and replacement. The rearward end of the barrel 28 (that end toward the operator when the tool is in use) terminates in a flared portion 32 preceded by a drippage storage chamber 34, and separated from the frame 2 by an air gap. Just forward of the storage chamber 34 the barrel is necked down, as at 36. The necked down portion 36 of the barrel 28 has an interior configuration substantially complementary to the cross section of the rod T, or generally of a figure eight design. Forward of the necked down portion 36 the barrel 28 is of cylindrical interior cross-section and is for a short length, designated 38, a straight barrel portion. The barrel 28 is then helically wound about the thermostat 26 to a point short of the nozzle attachment area where again there is a straight section of barrel 40 extending to the point where the nozzle 30 is attached.

Attached to the helically wound barrel 28 and extending along the rearward straight section 38 of the barrel is a heating element 42. The leads 22 carry electrical current to the heating element 42, the heat output of which is controlled by the thermostat 26 as will be described hereinafter.

Referring to FIGS. 5 and 6, an alternative form of the present invention includes a heat conducting sheet 44 connecting a heater element 42' with a barrel member 28' and the barrel member with a thermostat 26'. The sheet 44 may be aluminum, or any suitable metal with good heat conductive characteristics. An asbestos envelope 46 encloses the heater, barrel, and thermostat.

In operation, the leads 22 are connected to an ordinary household outlet. A nozzle 30 is chosen by the operator according to the task at hand. The nozzle selected by the operator is secured to the barrel 28 by a simple push and twist movement if a bayonet type joint is utilized, or by a screwing movement if a threaded joint is utilized.

The device is held in the hand, as shown in FIG. 1, with the palm and fingers of the hand disposed about the grip portion 4 of the frame member 2. The thumb of the hand is positioned on the feed wheel 6. A thermoplastic rod T, inserted in the channel 14, is heated by the heating element 42 in the housing 24 by current through the lead wires 22 disposed in the channel 16. Heating of the thermoplastic material transforms the material in the barrel 28 from a solid rod form into a fluid capable of flow through the nozzle 30.

As additional thermoplastic material is required, the operator depresses the feed wheel 6 and at the same time "thumbs" the feed wheel toward himself a number of degrees proportional to the additional amount of thermoplastic desired. The feed wheel 6 is thereby caused to move downwards in the slots 10 and in a clockwise direction upon the hubs 8, as viewed in FIG. 3. The teeth 12 of the feed wheel 6 embed in the surface of the thermoplastic rod T and urge it toward the barrel 28, thereby presenting fresh material to the heating element 42 and also exerting pressure upon the fluid material in the barrel 28 and the nozzle 30 so as to cause it to extrude from the nozzle. The roller 20 presents a low-friction surface which engages the V on the side of the cement rod opposite the feed wheel 6 (FIG. 3) and supports the cement opposite the area where pressure is applied by the feed wheel 6.

As long as thermoplastic material is flowing through the barrel 28 the heat emitted from the heating element 42 and directed inwardly, toward the barrel, is for the most part carried with the moving cement out of the nozzle. The heating element 42 is attached directly to the barrel 28 to facilitate the transfer of heat from the heating element to the barrel. The rearward portion of the heating element disposed about the straight portion 38 of the barrel heats the cement so that it will readily enter the helically wound portion of the barrel. The air gap between the rearward end of the barrel 28 and the frame member 2 minimizes transfer of heat from the barrel into the channel 14 where it is desirable to keep the cement in solid rod form.

When the cementing operation is interrupted and the tool is set aside, some unique features of the tool act to prevent the drool and drippage generally associated with devices of this type. Upon completion of a particular cementing task, the operator reverses slightly the travel of the cement. It will be appreciated that the feed wheel 6 is freely reversible. By a slight turning of the feed wheel in a counterclockwise direction, as viewed in FIG. 3, the rod T is urged toward the operator. Withdrawal of the rod rearwardly creates a suction in the barrel 28 which pulls rearwardly the fluid cement in the nozzle area. When there is substantially no movement of cement through the barrel 28 the cement, instead of carrying away the heat of the heating element 42, conducts it to the thermostat 26. The thermostat, upon sensing a rise in temperature, shuts off the heating element, so that melting of the thermoplastic rod ceases and that which is already molten becomes more viscous by cooling. Without a source of heat the nozzle 30, exposed to the air, cools very quickly allowing the cement therein to become particularly viscous without a propensity for drooling from the nozzle. In practice, it has been found to be satisfactory to have the thermostat shut off the heater when the thermostat senses a temperature of 330° F. and to restart the heater when the thermostat temperature is 320° F. Thus, the molten cement is retained in the fluid state but upon cooling becomes more viscous and therefore less inclined to drool. This is particularly so in the nozzle where its temperature drops to about 250° F. when cement is not being pushed through.

Fluid cement seeping rearwardly is restricted for the most part by the interior configuration of the necked-down portion of the barrel 36. This portion, besides restricting flow, is exposed to the air for rapid cooling of the cement, thus lowering its propensity for further rearward flow. However, that seepage which does get through the restricted and air cooled portion 36 enters the drippage storage chamber 34 which has increased cooling surface and space for the accumulation of cement. In the event cement travels further rearward in the fluid state, it would come to the flared portion of the barrel 32 which affords still greater cooling area and exposure to the air. Thus, the tool may be set aside temporarily without danger to the surface on which it is laid. This is deemed especially beneficial in tools for household use.

When the cementing operation is resumed, the cement, although viscous, is sufficiently fluid to flow easily when pressure is applied from the feeding means. The flow of cement again carries most of the heat from the heater out the nozzle. The thermostat, not sensing its upper temperature setting, allows the heater to continue operation. The cement in absorbing the heat becomes less viscous and flows easily. The drippage collected in the storage area 34 and the flared portion 32 is carried back into the barrel in the form of a film adhering to the moving rod T. Any cement which may have reached the flared portion 32 and which has hardened is readily melted by heat conducted along the barrel portion 36.

The operation of the arrangement of FIG. 5 is substantially the same as described above. Heat emitted from the heater element 42' is conducted by the sheet 44 to the barrel 28'. As long as the cement in the barrel is moving, most of the heat is carried away. However, when cement flow stops the heat continues on through the conducting sheet 44 to the thermostat 26' which, at a predetermined temperature, causes the heater element 42' to cease emitting heat. This particular arrangement has the advantage of a straight barrel member which is easier to fabricate. The asbestos envelop 46 prevents excessive heating of the housing 24.

Having thus described our invention, what we claim as new and desire to secure by Letters Patent of the United States is:

1. A device for applying thermoplastic adhesive comprising a frame, a barrel mounted on said frame, said barrel having a portion which is helically wound, said barrel having an inlet for receiving a thermoplastic rod and an outlet for dispensing molten thermoplastic, an electrical heating coil wound around said barrel for imparting heat to the barrel, a thermostat for controlling the heating element, said thermostat being mounted centrally of the helix formed by the wound portion of said barrel, said thermostat being in heat exchange relationship with substantially the full length of the wound portion of said barrel, and means mounted on said frame for feeding the thermoplastic rod to the inlet of said barrel.

2. The invention according to claim 1 in which said barrel inlet is characterized by an outwardly flared barrel entrance and a storage chamber adjacent said entrance, said storage chamber being adapted to collect leakage of thermoplastic material and facilitate the return of the material into the barrel with the rod when the rod is moved into the barrel.

References Cited by the Examiner

UNITED STATES PATENTS

| | | | |
|---|---|---|---|
| 1,293,456 | 2/1919 | Johns | 219—304 X |
| 2,233,558 | 3/1941 | Shaw. | |
| 2,247,816 | 7/1941 | McIlrath | 219—303 X |
| 2,288,248 | 6/1942 | Long. | |
| 2,673,920 | 3/1954 | Donovan et al. | 219—304 X |
| 2,742,142 | 4/1956 | Paulsen. | |
| 2,982,841 | 5/1961 | MacCracken | 219—304 X |
| 2,995,159 | 8/1961 | Berggren | 18—3.5 X |

FOREIGN PATENTS 513,524  2/1955  Italy.

ANTHONY BARTIS, *Primary Examiner.*